June 7, 1966 E. P. WORTHEN ETAL 3,254,705
STEAM GENERATOR
Filed Aug. 22, 1960 4 Sheets-Sheet 1

INVENTORS
Eugene Porter Worthen
John Henry Stelling
BY Natt M Emery Jr.
ATTORNEY June 7, 1966  E. P. WORTHEN ETAL  3,254,705
STEAM GENERATOR
Filed Aug. 22, 1960  4 Sheets-Sheet 2
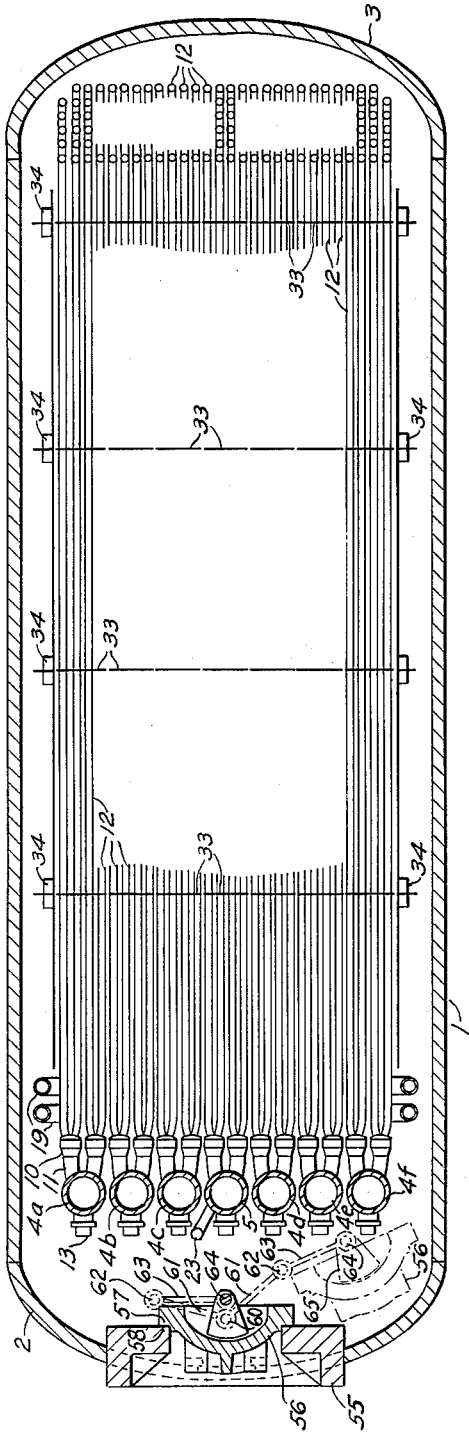
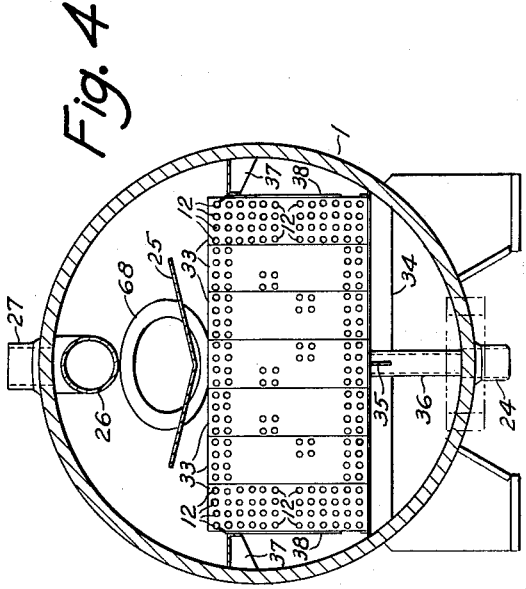
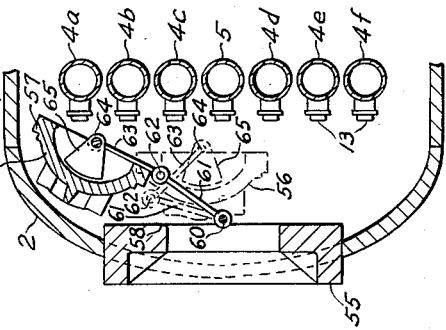
INVENTORS
Eugene Porter Worthen
John Henry Stelling
BY Natt M Emery Jr.
ATTORNEY June 7, 1966  E. P. WORTHEN ETAL  3,254,705
STEAM GENERATOR
Filed Aug. 22, 1960  4 Sheets-Sheet 3

INVENTORS
Eugene Porter Worthen
John Henry Stelling
BY Natt M Emery Jr.
ATTORNEY

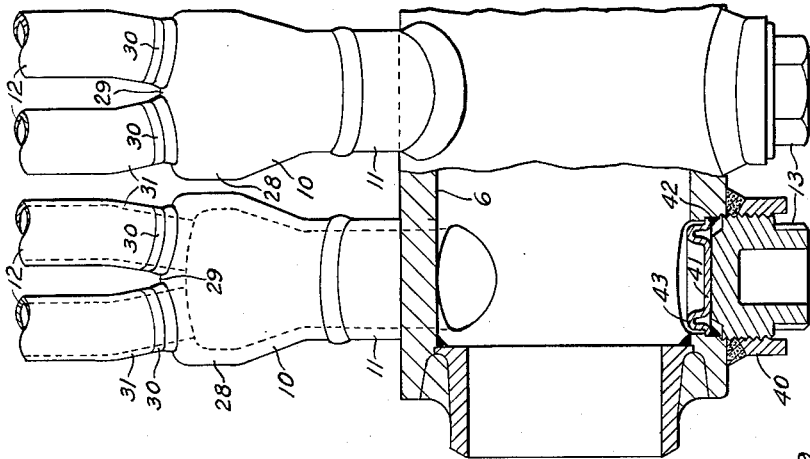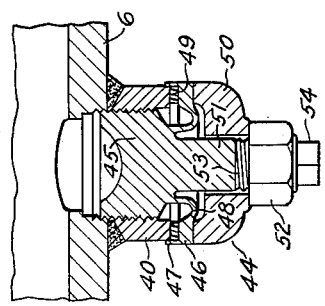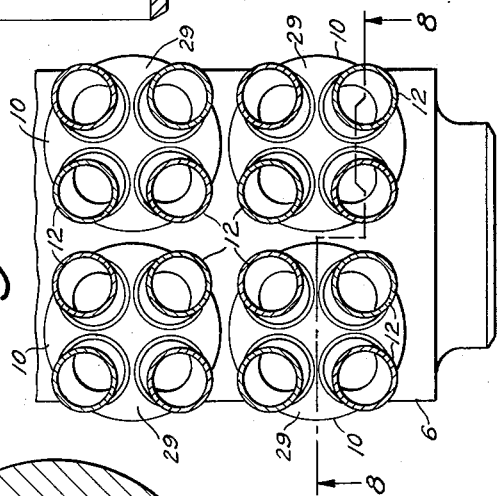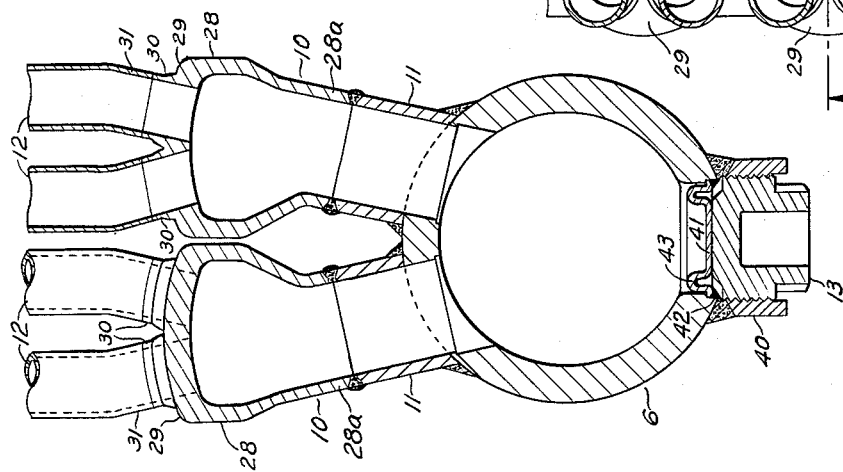

3,254,705
STEAM GENERATOR
Eugene Porter Worthen, Braintree, and John Henry Stelling, Wollaston, Mass., assignors, by mesne assignments, to Bethlehem Steel Corporation, a corporation of Delaware
Filed Aug. 22, 1960, Ser. No. 51,043
2 Claims. (Cl. 165—71)

The present invention relates broadly to a tubesheetless, U-tube type steam generator employing a primary heating medium to boil a secondary fluid, such as water, to convert the same into steam, and, in particular, to a tubesheetless, buttwelded U-tube type combined steam generator and non-condensable gas extractor for nuclear power plants. It is intended, in the preferred embodiment that the primary heating medium be saturated steam from a nuclear reactor of the boiling water type. In a representative system, steam from such a reactor is introduced into the present invention to raise steam in the secondary system. The secondary steam may then be used to operate a power plant. In such a system, the steam generator is preferably located above the reactor so that the primary steam condensate drains and returns by gravity to the reactor. If conditions require, drains may be returned by other means. The present invention may be adapted to use, as the primary heating medium, hot water or other hot fluid (the pressure in the apparatus then being maintained at a suitable value, as is well known to those familiar with the art) and my also use superheated steam.

As an example of the working conditions under which such steam generators may operate, the present invention has been designed to receive primary saturated steam from a reactor at a pressure of 1000 p.s.i.a. (approximately 545° F.) to generate secondary saturated steam at a pressure of 600 p.s.i.a. (approximately 486° F.), the primary steam condensate leaving at about 545° F. and the secondary feed entering at about 486° F. These figures are given by way of illustration only, and the present invention is in no way limited to such operating conditions.

Tremendous difficulties and high costs have been involved in the design and construction of conventional U-tube type steam generators used in conjunction with nuclear power plants. In addition to the high temperatures and pressures encountered, there is also the necessity of insuring that the primary steam, which may be contaminated by radioactive material, would not endanger personnel in the event of leakage in the equipment. Also, special materials of construction are required with problems of fabrication and cladding naturally arising.

Some of the disadvantages of the conventional type generators for high pressure nuclear power applications are as follows:

For the construction of these generators, tube sheet thicknesses in the order of 12" are required. The tube sheets are difficult to fabricate, and are very heavy and hard to handle. The tube sheet head is large in diameter, with many large bolted handhole openings using seal welded gaskets for the cover plates making access to the tubes difficult. The head is subject to the full reactor pressure. Tube holes for tubes as small as ½" in diameter must be drilled through the full thickness of the tube sheet. The tube sheet and tube sheet head are made of steel and must be cladded with welded layers of corrosion resistant steel amounting to a thickness of ⅜". This construction is required in order to avoid the tremendous expense of tube sheets and heads made entirely of corrosion resistant steel. The stainless steel tubes, which are lightly expanded into the very thick tube sheet, are strengthwelded at their ends to this corrosion resistant steel cladding on the tube sheet. This operation must be accomplished through the holes in the head. Cladding is impractical here because when two materials, having different coefficients of expansion (such as ordinary steel and corrosion resistant steel), are welded together, undesirable stresses cannot be avoided. Tube leakages in such conventional apparatus have occurred, and plugging of tube holes requires the openings of at least two large seal welded handholes (about 6" to 8" in diameter). Tube replacement requires the disassembly of practically the entire steam generator, including the cutting of a circumferential drum weld or the dismantling of a large bolted shell joint and the removal of the drum and head away from the tube sheet.

It is apparent that the conventional design is not very practical.

One of the objects of this invention is to provide a steam generator by means of which operating conditions may be improved, and to overcome the tremendous difficulties and high costs encountered in the present design and construction of the conventional U-tube type steam generators used in conjunction with nuclear power plants.

Another object of this invention is to provide a tubesheetless, buttwelded U-tube type combined steam generator and noncondensable gas extractor for nuclear power plants.

A further object of this invention is to provide a tubesheetless U-tube type steam generator with an internal gas separator to free the primary system therein of noncondensable gases.

Another object of this invention is to provide a tubesheetless U-tube type steam generator comprising small and simple inlet and outlet headers, with novel four-element fittings thereon, instead of the large, heavy and complicated tube sheets and heads conventionally used.

An object of this invention is to eliminate the requirement for cladding the internal parts of said tubesheetless U-tube type steam generator, by making such internal parts (which come into contact with the primary steam) of standard shapes with small wall thicknesses, so that the same can be made entirely of corrosion resistant steel at considerable economy.

An object of this invention is to provide a tubesheetless U-tube type steam generator having header handholes of small diameter, with small seal welds that are easily broken and rewelded should it become necessary to plug a tube hole in a four-element fitting on the header.

Yet another object of this invention is to provide an emergency handhole plug and gasket, in the event seal welding facilities are not immediately available, should it become necessary to plug a tube hole in a four-element fitting.

Still another object of this invention is to provide a tubesheetless U-type steam generator wherein, if the header handhole diaphragm should break, or if the emergency handhole gasket should leak, there will be no danger to personnel, as such leakage will be to the inside of the steam generator (and not into the operating space as would be the case in conventional tube-sheet designs), and operation of the generator can continue until time is available for repair work.

A further object of this invention is to provide a large manhole door easily opened to either side of the manhole, giving quick and easy access to the headers for inspection, repair and plugging of tubes.

An object of this invention is to provide a tubesheetless U-tube type steam generator in which element header assemblies can quickly and easily be replaced through the manhole opening, thus making possible easy replacement of tubes (contrary to the conventional tube-sheet design).

An object of this invention is to provide, at the header of a tubesheetless U-tube type steam generator, a special four-element fitting which permits the quick and easy plugging of a single U-tube, and which avoids the thermal stress problems caused in conventional apparatus in which thin tubes are welded with difficulty to very thick tube sheets.

An object of this invention is to provide an element header assembly, in a tubesheetless U-tube type steam generator, comprising a header and four-element U-tube assemblies, to permit the replacement of defective U-tubes without the loss of sound tubes.

Other and further objects of this invention will become apparent during the course of the following description.

Referring now to the drawings, in which like numerals represent like parts in the several views:

FIG. 3 represents a longitudinal section in plan, taken along the line 3—3 of FIG. 1, and shows in phantom the manhole cover swung to one side of the manhole.

FIG. 3a is similar to FIG. 3, showing in solid lines the manhole cover swung to the other side of the manhole opening, the position of said manhole cover intermediate such open position and the closed position being shown in phantom.

FIG. 4 represents another transverse section in elevation, taken along the line 4—4 of FIG. 1.

FIG. 7 represents an enlarged section in elevation, taken along the line 7—7 of FIG. 6.

FIG. 8 represents an enlarged section in plan, taken along the line 8—8 of FIG. 7.

FIG. 9 represents a view in elevation of FIG. 8, partly broken away at the centerline.

FIG. 10 represents a medial sectional view of the emergency handhole plug, and corresponds with a similar view of the regular handhole plug shown in FIG. 9.

Figures 1, 2:
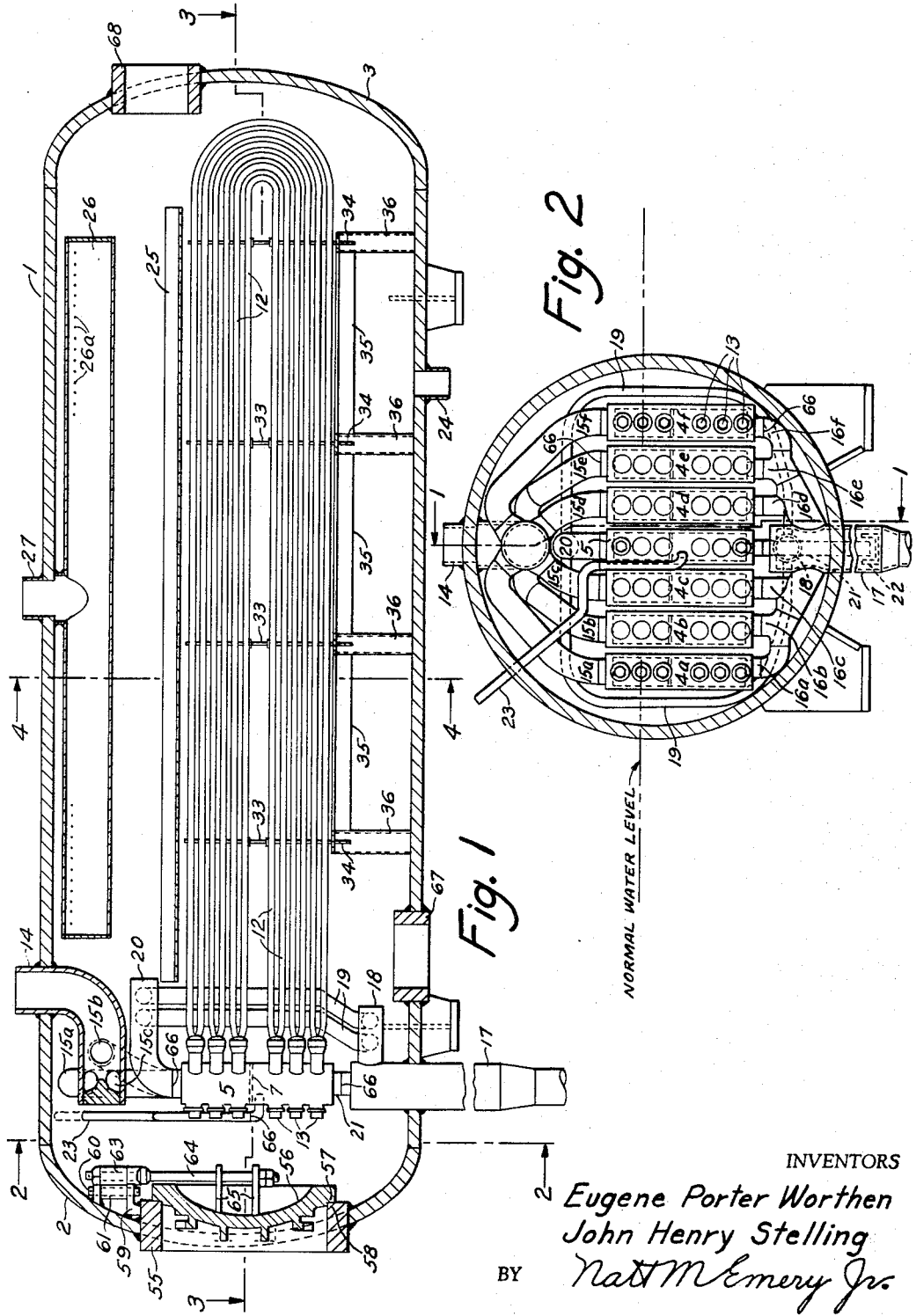
FIG. 1 represents a longitudinal section in elevation of the tubesheetless U-tube type steam generator, and is taken along the line 1—1 of FIG. 2.
FIG. 2 represents a transverse section in elevation, taken along the line 2—2 of FIG. 1.

The tubesheetless U-tube type steam generator is seen to comprise drum or shell 1, with dished ends 2 and 3, containing six element header assemblies 4a–4f and a gas collecting header assembly 5.

The element header assemblies 4a–4f, and the gas collecting header assembly 5, each comprises a header 6, preferably constructed from standard size pipe, a transversely disposed diaphragm 7 therein and defining inlet chamber 8 and outlet chamber 9, four-element fittings 10 welded to stubs 11, the latter in turn being welded to header 6, U-tubes 12 welded to four-element fittings 10, and handhole plugs 13.

Primary steam inlet 14 communicates through conduits 15a–15f with the upper inlet chambers 8 of element header assemblies 4a–4f respectively.

Drain conduits 16a–16f communicate between the outlet chambers 9 of element headers 4a–4f respectively and drain collecting header 17, as best shown in FIG. 2. Drain collecting header 17 is closed off at the top. Adjacent the upper portion of drain collecting header 17 is a pipe 18 communicating through conduits 19 and through conduit 20 with inlet chamber 8 of gas collecting header assembly 5. Outlet chamber 9 of said gas collecting header assembly 5 communicates through drain conduit 21 and drain seal 22 with drain collecting header 17. Conduit 23 communicates with the upper portion of outlet chamber 9 of gas collecting header 5, just below diaphragm 7, to carry off noncondensable gases.

Thus far has been described the structure of the primary circuit or system which receives the primary heating medium or primary steam.

In operation, the primary saturated steam from the boiling water reactor enters the tubesheetless U-tube type steam generator on the top of drum 1 through primary steam inlet 14, passes through conduits 15a–15f to the inlet chambers 8 of element header assemblies 4a–4f respectively, thence through four-element fittings 10 and U-tubes 12 (in which most of the primary steam condenses in giving up its latent heat to the surrounding water), the mixture of condensate, uncondensed primary steam and non-condensable gases passing back into outlet chambers 9 of element header assemblies 4a–4f and thence into drain conduits 16a–16f respectively. The condensate is led to drain collecting header 17 and may then be directed to the drain cooler of the primary system.

The uncondensed primary steam and non-condensable gases pass from the upper portion of drain collecting header 17 into pipe 18 and through conduits 19 and 20 into inlet chamber 8 of gas collecting header assembly 5, thence through four-element fittings 10 and U-tubes 12 (in which the remainder of the uncondensed primary steam condenses in giving up its latent heat to the surrounding water), the mixture of condensate and non-condensable gases passing back into outlet chamber 9 of gas collecting header assembly 5. This condensate passes into drain conduit 21 and through drain seal 22 (which is required in order to balance the small pressure difference between drain conduit 21 and drain conduits 16a–16f) into drain collecting header 17. The non-condensable gases collect at the top of outlet chamber 9 of gas collecting header assembly 5 and pass out through conduit 23, and are then disposed of by suitable means.

The secondary system or circuit comprises feed inlet 24 at the bottom of drum 1, a baffle 25, dry pipe 26 of conventional construction with inlet holes 26a, and secondary steam outlet 27. In operation, feed enters drum 1 through feed inlet 24 and the normal water level is preferably maintained as shown in FIG. 2. (Where the feed inlet temperature and the saturated steam temperature are approximately equal, as is contemplated in the present apparatus, no internal feed distributing pipe is considered necessary. Other embodiments of this invention might use a perforated feed distribution pipe at the bottom of the shell.) The feed takes up the latent heat of the primary steam in U-tubes 12 and boils. This secondary steam thus raised passes baffle 25 and flows into dry pipe 26 and out of the steam generator through secondary steam outlet 27.

Four-element fittings 10, which connect pipe sections 11 on header 6 to U-tubes 12, replace the complicated conventional tube sheets presently used in the design of steam generator and heat exchangers for nuclear power plants. Each fitting 10, which may be forged or cast depending upon the properties of the material required, has an enlarged head 28 slightly offset from a base pipe section 28a (as shown in FIG. 8), the surface 29 of same preferably being curved as shown. Stubs 30 are welded to head 28, and if fitting 10 is forged, said stubs 30 can also be forged integral therewith, and are preferably normal to said curved surface 29 and evenly spaced about said head 28. Ends 31 of U-tubes 12 are bent so that they meet squarely the stubs 30 (i.e., the plane of contact is at right angles to the centerline of ends 31 and is the same as a right cross section of the ends 31, namely a circle) and are buttwelded thereto. The plane of contact being circular and at right angles also to the centerline of stubs 30, said stubs 30 may likewise be circular and thus by suitably orienting said stubs about the centerline of head 28, fittings 10 can be designed small enough to avoid interference therebetween when arranging the same to assimilate a tube sheet layout. It should also be noted that, in buttwelding a U-tube end 31 to a stub 30, an internal welding ring may be required. Such rings are well-known in the welding art and are not shown here. Because the plane of contact at the weld is circular, such welding ring being circular can easily be drilled out after the weld has been made. The drilling should be done before the multi-element fitting 10 has been attached to pipe sections 11 on header 6.

It will be apparent from the foregoing that four-element fittings 10 permit a tube bundle arrangement of practically any pitch (center-to-center spacing of tubes 12).

A group of four U-tubes 12, correctly spaced, and two four-element fittings 10 form a four-element U-tube assembly 32. In the particular embodiment shown, there are, in each element header assembly 4a–4f and in the gas collecting header assembly 5, six four-element U-tube assemblies 32.

U-tubes 12 are spaced and supported in drum 1 by means of tube plates 33, the latter resting on a grid of beams 34 and 35 which are tied to the sides of the drum 1 and which are braced by box-like columns 36. Tube plates 33 are each associated with only one of the element header assemblies 4a–4f or with gas collecting header assembly 5, to permit the withdrawal from said drum 1 of any one of said element header assemblies 4a–4f or said gas collecting header assembly 5. Brackets 37 carry plates 38 which bear against the tube plates 33 of the outside element header assemblies 4a and 4f thus keeping the entire tube bundle in position.

Tube plates 33 may be of the well-known drilled type comprising a solid plate with holes therethrough to receive the tubes. These holes may correspond in size with the dimension of U-tube 12, in which instance ends 31 are not bent (as shown in FIGS. 8 and 9) until the same have been passed through all of the tube sheets 33 associated therewith, and afterwards, ends 31 can be buttwelded to stubs 30 of four-element fittings 10.

Figure 5:
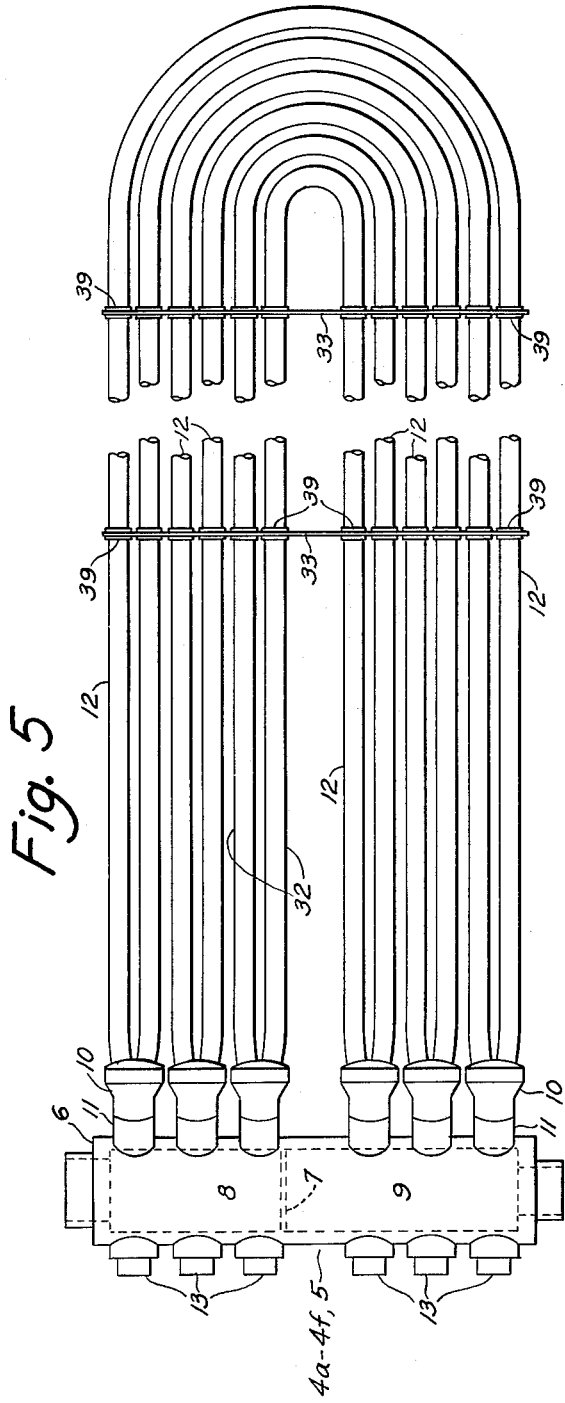
FIG. 5 represents an enlarged view in elevation of a typical element header assembly and of the gas collecting header assembly (the latter being shown without the gas removal conduit), showing the pipe header, the four-element fittings, the U-tubes and the handhole plugs.
Figure 6:
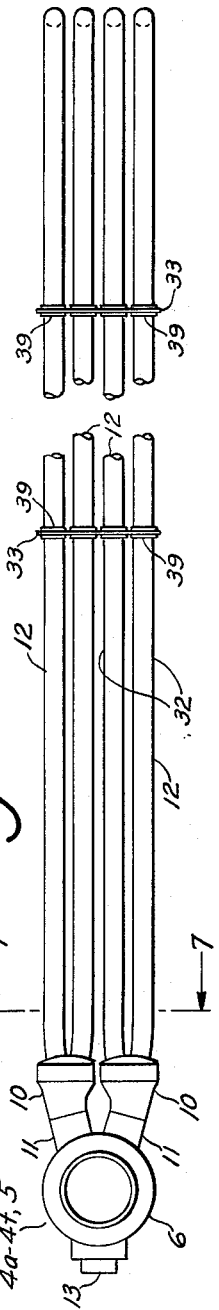
FIG. 6 represents an enlarged view in plan of a typical element header assembly and of the gas collecting header assembly (the latter being shown without the gas removal conduit).

Tube plates 33 may be of the drilled type in which the holes are large enough to permit the bent ends 31 of U-tubes 12 to pass through. In this embodiment, ferrules 39 (see FIGS. 5 and 6) are inserted in the oversized holes of each tube plate 33 as the ends 31 are passed therethrough, said ferrules then being tackwelded to the tube plate 33.

Tube plates 33 may be of the slotted type such as represented in U.S. Patent 2,643,862 by the numeral 53. The horizontal slot openings in such a tube plate 33 must be deep enough to accommodate all of the U-tubes in each horizontal row (four in the preferred embodiment), and may be oversized in which event ferrules on the U-tubes 12 will be used to fit in said slots and will then be welded to said tube plate 33. In such embodiment, the four-element U-tube assemblies 32 (each comprising four U-tubes 12 and two four-element fittings 10) can be prefabricated and installed as a unit.

When a U-tube 12 develops a defect, the openings in four-element fittings 10 corresponding to the defective U-tube 12 can be plugged, permitting continued operation of the steam generator until such time as it is convenient to replace the defective U-tube 12. The present invention permits easy access through the appropriate header 6 to the proper hole of the particular four-element fitting 10 for quick installation of a plug (not shown).

Each header 6 is provided with a number of internally threaded collars 40 welded thereto, each of said collars 40 being located opposite a pair of four-element fittings 10 as shown in FIGS. 8 and 9. To close the openings in header 6, diaphragms 41 are seal welded thereto at 42. Expansion ring 43 on diaphragm 41 prevents seal weld 42 from cracking as it cools. Handhole plug 13 is externally threaded to mate with collar 40, and when fully inserted, bears against diaphragm 41. Thus, in this design, tightness is maintained by diaphragm 41 and seal weld 42, and the holding power is provided by the handhole plug 13. Means (not shown) will be provided to prevent handhole plug 13 from unscrewing in service. To open the header 6 to gain access to the interior of any particular four-element fitting 10, handhole plug 13 is unscrewed, seal weld 42 is cut, and diaphragm 41 is removed.

In an emergency, when handhole plug 13 and diaphragm 41 have been removed from an opening in header 6, and seal welding facilities are not immediately available to reweld diaphragm 41 at 42 to header 6, emergency handhole plug 44 may be used.

Emergency handhole plug 44 comprises externally threaded head 45 mating with collar 40, gasket retaining ring 46 with circumferential lip 47 and integrally mounted to head 45 through intermediate resilient ring portion 48, and a gasket 49 retained by said gasket retaining ring 46 and circumferential lip 47 and adapted to seat on collar 40 as shown in FIG. 10. Preferably, circumferential lip 47 closely engages collar 40. Emergency handhole plug 44 further comprises a compression ring 50 slidably mounted to shaft 51 and adapted to bear against gasket retaining ring 46, a nut 52 threadedly mounted to threaded portion 53 and adapted to bear against compression ring 50, and a square-headed end 54 by means of which plug 44 can be threaded into header 6.

To use emergency handhole plug 44, threaded head 45 is screwed into collar 40 to bring gasket 49 to seat against collar 40, said head 45 not being screwed in to the extent that gasket 49 will be damaged by rotational friction. Then, nut 52 is screwed down on threaded portion 53 to force compression ring 50 against gasket retaining ring 46, thereby compressing gasket 49.

Manhole 55 permits access to the interior of drum 1. Manhole cover 56 is located inside drum 1 and is provided with seat 57 which bears through suitable gasket means (not shown) against seat 58 of the manhole 55, the internal pressure in the operating steam generator serving to force said manhole cover 56 and seat 57 tightly against seat 58 through the aforesaid gasket means.

Bracket 59, mounted to drum 1 above the center of manhole 55, rotatably supports pin 60, the latter pivotally supporting link 61. Pin 62 pivotally connects links 61 and 63. Pin 64 pivotally connects link 63 and manhole cover 56 through brackets 65 secured to manhole cover 56 adjacent the center thereof. With this supporting arrangement, manhole cover 56 can be moved to either side of manhole 55, as shown in FIGS. 3 and 3a, away from the side of drum 1 where space is required for working on equipment such as header handholes, etc. This feature permits a drum of shorter length to be used.

It is apparent that all of the element header assemblies 4a–4f and gas collecting header assembly 5 can be removed or installed one by one through the manhole 55. Welds 66 which join these assemblies to conduits 15a–15f, 20, 16a–16f and 21, and which join together the several parts of conduit 23, can be cut and rewelded easily as they are accessible from two sides (viz., through manhole 55 and manhole 67).

Manholes 67 and 68 are, of course, closed when the steam generator is in operation, the closure means (not shown) being conventional and well-known to those familiar with the art.

It will be seen that we have provided a novel steam generator having many advantages over conventional steam generators, some of which are:

(1) Small and simple inlet and outlet headers made from standard pipes (6″ in the preferred embodiment, although this size may vary), together with the four-element fittings, replace the large, heavy and complicated tube sheets and heads.
(2) The U-tube ends are simply butt-welded to the stubs of the four-element fittings, thus eliminating a complicated setup for welding small thin tubes to heavy tube sheets. In certain cases, brazing of the U-tube ends to the stubs may be preferable.

(3) The four-element fittings can be developed for mass production or can be cast.

(4) All pressure parts for the primary system are small (in the preferred embodiment, the largest diameter is about 8"), low in weight, simple to handle and easy to fabricate.

(5) Generally, it is not required to clad any of the internal parts which come into contact with the primary heating medium, the maximum thickness of any of these walls in the preferred embodiment being less than ¾". This permits the use of parts made entirely of Monel or stainless steel, for example, at reasonable cost. (In the preferred embodiment, only those steel elements used where the primary system leads penetrate the steel drum are clad on the inside.)

(6) Commercial standard dimensions are used for most parts of the primary system.

(7) Header handholes are small (only 2¼" in diameter in the preferred embodiment), and the seal welds are small and are easily broken and rewelded should it be necessary to plug a tube hole in a four-element fitting. If seal welding facilities are not immediately available, a special handhole plug and gasket is provided for such an emergency.

(8) If a header handhole diaphragm should break, or if an emergency handhole gasket should leak, personnel will not be endangered as the leakage will be to the inside of the steam generator.

(9) An easy to open manhole cover, opening to either side of the large manhole in the drum head, provides quick access to headers for inspection, repair and plugging of tubes, and for removal of header assemblies.

(10) Header assemblies are removed and installed through the manhole, permitting easy replacement of tubes, contrary to the conventional tube sheet design, and due to the possibility of swinging the manhole cover to either side of the drum, the drum length is short.

(11) Simple and effective means are provided to extract noncondensable gases.

Although we have thus described our invention in considerable detail, we do not wish to be limited narrowly to the exact and specific particulars disclosed, but we may also use such substitutes, modifications or equivalents thereof as are included within the scope and spirit of the invention or as pointed out in the appended claims.

We claim:

1. A vapor generator for vaporizing a secondary liquid by means of a condensable primary fluid comprising a shell, a first pipe header in said shell, a first inlet chamber and a first outlet chamber in said first pipe header, first tube means communicating between said first inlet chamber and said first outlet chamber and extending substantially the length of said shell, primary fluid inlet means extending into said shell and communicating with said first inlet chamber, a pocket within said shell communicating with said first outlet chamber to collect uncondensed primary fluid and noncondensable gases, a second pipe header in said shell, a second inlet chamber and a second outlet chamber in said second pipe header, second tube means communicating between said second inlet chamber and said second outlet chamber and extending substantially the length of said shell, conduit means communicating between said pocket and said second inlet chamber, drain means communicating with said first and second outlet chambers and extending outside said shell to remove primary fluid condensate, conduit means communicating with the upper portion of said second outlet chamber and extending outside said shell to remove noncondensable gases, means to introduce secondary liquid feed into said shell, and means to withdraw secondary vapors from said shell.

2. A vapor generator for vaporizing a secondary liquid by means of a condensable primary fluid comprising a shell, a plurality of first pipe headers in said shell, each of said first pipe headers comprising a first inlet chamber and a first outlet chamber, a plurality of first tube means each communicating between the first inlet chamber and first outlet chamber of one of said first pipe headers and extending substantially the length of said shell, primary fluid inlet means extending into said shell and communicating with said first inlet chambers, a drain header extending outside of said shell, means closing off the top of said drain header, first drain conduits communicating between said first outlet chambers and said drain header below the top thereof, that portion of said drain header lying between the top thereof and the point of attachment of said first drain conduits forming a pocket to collect uncondensed primary fluid and noncondensable gases, a second pipe header in said shell, a second inlet chamber and a second outlet chamber in said second pipe header, second tube means communicating between said second inlet chamber and said second outlet chamber and extending substantially the length of said shell, a conduit communicating with that portion of said drain header lying between the top thereof and the point of attachment of said first drain conduits and extending to said second inlet chamber, a second drain conduit communicating with the lower portion of said second outlet chamber to remove primary fluid condensate, conduit means communicating with the upper portion of said second outlet chamber and extending outside said shell to remove noncondensable gases, means to introduce secondary liquid feed into said shell, and means to withdraw secondary vapors from said shell.

References Cited by the Examiner

UNITED STATES PATENTS

| | | | |
|---|---|---|---|
| 1,558,573 | 10/1925 | Bancel | 165—113 |
| 1,947,863 | 2/1934 | Mahoney | 165—113 |
| 2,043,628 | 6/1936 | Reid | 220—25 |
| 2,237,617 | 4/1941 | Trede | 165—145 |
| 2,271,411 | 1/1942 | Thuaits | 220—25 |
| 2,505,303 | 4/1950 | Randa | 285—155 |
| 2,643,862 | 6/1953 | Stelling | 257—239 |
| 2,762,635 | 9/1956 | Lorber | 257—248 |
| 2,893,590 | 2/1959 | Buckley | 220—39 |
| 2,941,236 | 6/1960 | Monroe et al. | 220—34 |
| 2,962,185 | 11/1960 | Starr et al. | 220—39 |

FOREIGN PATENTS

| | | |
|---|---|---|
| 1,122,105 | 9/1956 | France. |
| 402,457 | 12/1933 | Great Britain. |

ROBERT A. O'LEARY, *Primary Examiner.*

HERBERT L. MARTIN, CHARLES SUKALO,
*Examiners.*

M. A. ANTONAKAS, *Assistant Examiner.*